Jan. 14, 1958 H. L. BERKHOUT ET AL 2,820,093
CONTRAST CONTROL-CIRCUIT IN TELEVISION RECEIVERS
Filed Feb. 18, 1953
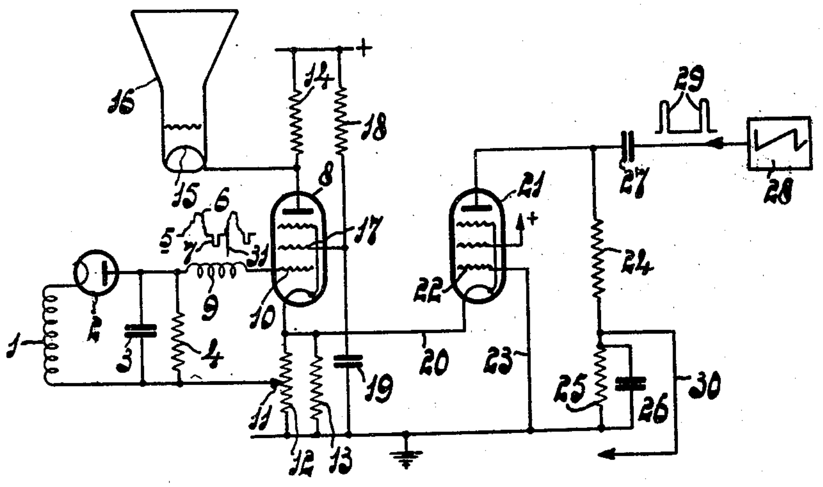
INVENTORS
Hendricus Laurens Berkhout
Frederik Kerkhof
Peter Johannes Hubertus Janssen.
BY
AGENT United States Patent Office 2,820,093

Patented Jan. 14, 1958

2,820,093

CONTRAST CONTROL-CIRCUIT IN TELEVISION RECEIVERS

Hendricus Lourens Berkhout, Frederik Kerkhof and Peter Johannes Hubertus Janssen, Eindhoven, Netherlands, assignors, by mesne assignments, to North American Philips Company, Inc., New York, N. Y., a corporation of Delaware Application February 18, 1953, Serial No. 337,614

Claims priority, application Netherlands February 21, 1952

2 Claims. (Cl. 178—7.5)

The invention relates to a contrast control-circuit arrangement for use in a television receiver, in which the control-grid circuit of an amplifying tube is coupled for direct current to an output impedance of the detector, an output circuit of this amplifying tube being coupled for direct current to a control-electrode of a control-tube, from the output circuit of which is derived a control-voltage for the automatic gain control, this control-tube being conductive only during the occurrence of horizontal synchronizing pulses.

It is known that in television receivers the contrast control may be carried out in stages lying behind the detector. A known form is that in which the cathode lead of an amplifying tube connected after the detector includes a variable cathode resistor. Such a solution may be applied without objection, if the control takes place in the cathode lead of an amplifying tube, the cathode current of which is low.

However, if the cathode resistor of the amplifying tube concerned is traversed by a high current, for example, of the order of 50 to 100 ma., it is difficult to find a suitable variable resistor, the branch of which permits the passage of such a high current. In principle a wire resistor might be employed in this case, but such a resistor is comparatively costly and owing to the inductance occurring it might affect the frequency characteristic of the amplifying tube.

The contrast control-circuit according to the invention obviates this disadvantage and is characterized in that the output impedance of the detector is coupled on the one hand for direct currents to the control-grid of the amplifying tube and on the other hand to an adjustable tapping of a resistor included in the cathode lead of the amplifying tube.

In the circuit-arrangement according to the invention no current passes through the tapping, so that the cathode resistor may be a carbon resistor.

In order that the invention may be readily carried into effect, it will now be described in detail with reference to the accompanying drawing.

According to the drawing, the intermediate-frequency television signal occurs across the inductor 1, which is connected to the detector circuit, consisting of the rectifier 2 and the parallel combination of the capacitor 3 and the resistor 4.

At the given polarity of the rectifier 2 and at the reception of a television signal which is modulated in a negative sense on a carrier wave, a demodulated signal of the shape indicated at 5 occurs across the resistor 4, the image signals 6 being positive and the synchronizing pulses 7 negative. This signal is supplied to the control-grid circuit of an amplifying tube 8. For this purpose the upper end of the resistor 4 is connected for direct currents via the inductor 9 to the control-grid 10 of the tube 8. The lower end of the resistor 4 is connected for direct currents to the sliding contact 11 of the resistor 12, which is included in the cathode lead of the tube 8.

In parallel with the resistor 12 is connected a resistor 13, the value of which is lower than that of the resistor 12.

The anode circuit of the tube 8 comprises a resistor 14. In a manner known, and shown only diagrammatically, the voltage across the resistor 14 is supplied in direct-current manner to the cathode 15 of a cathode-ray tube 16.

The screen grid 17 of the amplifying tube 8 is connected through a resistor 18 to the positive terminal of the supply battery and through a coupling capacitor 19 to ground.

The cathode of the tube 8 is connected for direct currents through the conductor 20 to the cathode of the tube 21, which serves as a control-tube for producing a control-voltage for automatic gain control. For this purpose the control-grid 22 of the tube 21 is connected to ground through the conductor 23. The anode of the tube 21 is also connected to ground through the series combination of the resistors 24 and 25. In parallel with the resistor 25 is connected a capacitor 26.

The anode of the tube 21 is, moreover, connected through the blocking capacitor 27 to a source 28, for example the horizontal sawtooth circuit, from which pulses 29 with horizontal frequency are derived and supplied with positive polarity to the anode of the tube 21, so that this tube can become conductive only at instants when the horizontal synchronizing pulses 7 occur in the demodulated signal 5.

From the parallel combination of the resistor 25 and the capacitor 26, through the conductor 30 is derived the control-voltage for automatic gain control and supplied in known manner (not shown) to the high-frequency or intermediate-frequency stages of the receivers.

At the reception of a television signal in the circuit-arrangement shown in the drawing the contrast is controlled by displacing the sliding contact 11 of the cathode resistor 12, so that the value of the negative feedback, which is determined by the upper portion of the resistor 12, is varied. The resistor 12 is, it is true, traversed by current, but via the sliding contact 11 no current is taken, so that the resistor 12 may be a carbon resistor.

If it is desired to reduce the current passing through the resistor 12, the parallel resistor 13, having a lower resistance value, is provided, so that the major part of the cathode current of the tube 8 passes through the resistor 13.

A television signal occurs across the parallel combination of the resistors 12 and 13 with the same polarity as the signal indicated at 5, so that the signal occurs also with this polarity at the cathode of the tube 21.

At the instants when the synchronizing pulses 7 occur, and hence also the pulses 29, the tube 21 becomes conductive.

The value of the current then passing through tube 21 varies as a function of the signal supplied to the cathode and this current is supplied to the integrating network consisting of the parallel combination of the resistor 25 and the capacitor 26.

If the amplitude of the incoming signal varies and hence the voltage occurring during the synchronizing pulses, the current passing through the tube 21 also varies and hence the voltage across the resistor 25, the polarity being such that the control-voltage may be directly used for controlling the amplification factor of the stages preceding the detector.

Thus the peaks of the synchronizing pulses 7 are kept at a substantially constant level.

These peaks are supplied with negative polarity to the control-grid of the tube 8 and if the control-circuit is correctly proportioned they are such that at their occurrence only weak current passes through the tube 8.

This has the advantage that in the event of interference, for example, caused by sparks in the signal, this interference being of the kind indicated at 31 in the signal 5, the interference is reduced substantially to the level of the peaks of the synchronizing signals.

In spite of the automatic gain control employed in the circuit-arrangement shown it may occur that the signal supplied to the cathode-ray tube 16 constitutes an excessive charge for the high-voltage generator used for feeding this cathode-ray tube.

This is the case, if at a variation of the image to be transmitted, the mean image brightness thereof is excessively high, for example, in the event of switching over from a comparatively dark scene to a snow scene.

With the use of the sliding contact 11 the contrast control may then be adjusted in a manner such that even at the maximum mean image brightness no overload of the high voltage supply source occurs or else the contrast control may be adjusted to a moderate image brightness, any consequent overload being then accepted.

In the circuit-arrangement shown in the drawing neither the one nor the other operation is necessary, since an automatic contrast control is obtained with the use of the screen-grid circuit of the tube 8.

Since the screen-grid resistor 18 is decoupled with the aid of the capacitor 19, the mean screen-grid current will also be low at a low mean brightness, so that the screen-grid voltage is high.

At a high mean brightness the screen-grid voltage will, however, be low.

Therefore, at the occurrence of an image having a high mean image brightness, the contrast is reduced and at a low mean image brightness the contrast is enhanced.

With respect to the contrast control with the aid of the sliding contact 11 of the resistor 12, the following may be observed:

As long as this contact 11 is not displaced, the automatic gain control tends to keep the peaks of the synchronizing pulses at the control-grid of the tube 8 on a constant level.

If the sliding contact 11 is displaced, the negative feedback of the tube 8 varies and hence the dynamic characteristic of the tube. The automatic control-voltage tends to keep constant the voltage of the horizontal synchronizing pulses across the resistor 12 and hence the current passing through this resistor.

Thus the position of the peaks of the synchronizing pulses at the control-grid 10 will vary slightly, in a manner such that the current passing through the tube 8 at the occurrence of these pulses remains substantially constant. The resultant displacement of the position of the synchronizing pulses appears to be unobservable in practice.

While we have thus described our invention with specific examples and embodiments thereof, other modifications will be readily apparent to those skilled in the art without departing from the spirit and the scope of the invention as defined in the appended claims.

What is claimed is:

1. A contrast control circuit in a television receiver which utilizes a cathode-ray tube, comprising an electron discharge device having an anode, an output circuit including means directly connecting an electrode of the cathode-ray tube to said anode, said electron discharge device also having a cathode and a control grid, a source of operating potential having positive and negative terminals, an impedance having an adjustable tap and connected between said cathode and the negative terminal of said potential source, said positive terminal being connected to said output circuit, a detector having an output circuit, means for connecting for direct current said detector output circuit between said control grid and said tap, a source of television signals connected to said detector and containing a video signal and synchronizing pulses which exceed the maximum amplitude of the video signal, said detector being polarized with respect to said television signals so as to provide at said control grid a detected television signal having negative-going synchronizing pulses whereby the tips of said synchronizing pulses provide an amplitude reference level, said impedance having a value of impedance sufficiently high at the signal frequencies so that the signal appears across said impedance whereby the setting of said tap controls the amount of negative feedback of said electron discharge device, and a circuit directly connected to the output circuit of said electron discharge device for providing an automatic gain control voltage for said television receiver.

2. A contrast control circuit in a television receiver which utilizes a cathode-ray tube having at least a cathode element, said receiver being adapted to receive a composite television signal including a video signal and horizontal synchronizing pulses which exceed the maximum amplitude of the video signal, comprising a first electron discharge device having at least an anode, a cathode, a control grid and a screen grid, a first impedance having an adjustable tap thereon, said impedance being connected between said last-named cathode and ground, a detector having an output circuit, means for connecting for direct current said detector output circuit between said control grid and said tap, means connected to feed said television signal to said detector, said detector being polarized with respect to said television signal so as to provide at said control grid a detected television signal having negative-going synchronizing pulses whereby the tips of said synchronizing pulses provide an amplitude reference level, said first and second impedances having a combined value of impedance sufficiently high at the signal frequencies so that the signal appears across said impedances whereby the setting of said tap controls the amount of negative feedback of said first electron discharge device, a second impedance connected across said first impedance, said second impedance having a value of impedance which is lower than that of said first impedance, a source of operating potential having a positive potential terminal and a grounded negative terminal, a third impedance connected between said anode and said positive potential terminal, said anode being directly connected to the cathode element of said cathode-ray tube, a screen grid resistor connected between said positive potential terminal and said screen grid, a capacitor connected between said screen grid and ground, a second electron discharge device having at least an anode, a cathode, and a control grid, the control grid of said second device being directly connected to ground, means for directly connecting the cathode of said second device to the cathode of said first device, a load impedance having an end thereof connected to the anode of said second device, a control voltage impedance interposed between the remaining end of said load impedance and ground, a second capacitor connected across said control voltage resistor, means for applying positive pulses to the anode of said second device, said positive pulses rendering said second device conductive for the duration of each of said horizontal synchronizing pulses, and a terminal located at the junction of said load impedance and said control voltage resistor for providing an automatic gain control voltage for said television receiver.

References Cited in the file of this patent

UNITED STATES PATENTS

| | | |
|---|---|---|
| 2,192,189 | Haffcke | Mar. 5, 1940 |
| 2,241,553 | Kallmann et al. | May 13, 1941 |
| 2,522,967 | Shaw | Sept. 19, 1950 |
| 2,593,011 | Cotsworth | Apr. 15, 1952 |

OTHER REFERENCES

TFT, Bd. 28, H. 7, 1939, page 250.

Wireless World, February 23, 1939, page 175.

Philco Model 48–700, Service Notes, copyright 1948.